3,598,785
POLYSILOXANE AMIDES
Fred F. Holub, Schenectady, and Denis R. Pauzé, Scotia,
N.Y., assignors to General Electric Company
No Drawing. Filed Mar. 11, 1970, Ser. No. 18,756
Int. Cl. C08f 11/04
U.S. Cl. 260—46.5                     12 Claims

ABSTRACT OF THE DISCLOSURE

Polysiloxane amides are obtained from the reaction of an organic diamine, either trimellitic anhydride or a haloformyl phthalic anhydride, and a polysiloxane containing terminal silicon-bonded $$-R-\overset{O}{\underset{\|}{C}}-Z$$

groups where R is a divalent hydrocarbon radical and Z is a halogen, or hydroxyl radical, or the —OCH$_3$ radical. Heat-resistant amide imide compositions obtained from converting such polysiloxane amides can be used for insulation and protective purposes where resistance to heat and corona are important requirements.

---

This invention is concerned with polysiloxane amides. More particular, the invention is concerned with a polymeric composition composed of recurring structural units of the formulas (a)

I
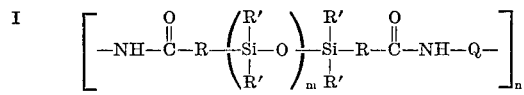

and (b)

II
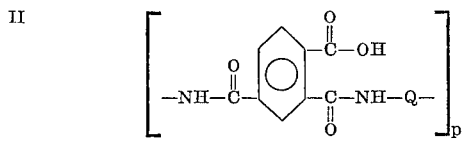

and imido derivatives therefrom composed of recurring structural units of Formula I and III
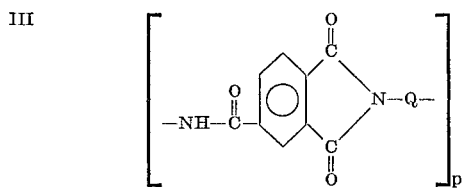

where R is a divalent hydrocarbon radical, R' is a monovalent organic radical, preferably but not exclusively selected from the class consisting of monovalent hydrocarbon radicals and halogenated monovalent hydrocarbon radicals, Q is a divalent organic radical, $m$ is a whole number equal to at least 1, for example, 1 to 100, or more and $n$ and $p$ are the same or different whole numbers greater than 1, for instance, up to 10,000 and more.

The above polysiloxane amides can be prepared by effecting reaction of a mixture of ingredients comprising a polysiloxane of the general formula IV
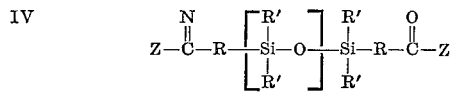

a diamino compound of the general formula

V                     H$_2$N—Q—NH$_2$ and a trimellitic compound (also identified as "phthaloyl compound") of the general formula

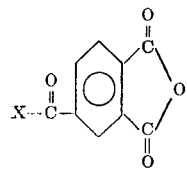

VI where R, R', Q and $m$ have the meanings given above, Z is a member selected from the class consisting of halogen (e.g., chlorine, bromine, fluorine, etc.), the hydroxyl radical and the —OCH$_3$ radical and X is a member selected from the class consisting of halogen (e.g., chlorine, bromine, etc.) and the hydroxyl radical.

The polymeric compositions described in this invention can be used in electrical insulation, as protective surface coatings and in the formation of heat-resistant films. Solutions or other forms of these polyamide acid resins can be used to coat electrical conductors such as copper, aluminum, alloys of copper and aluminum, etc., by various techniques, including electrocoating and thereafter heat-cured to the imide state. Such solutions can also be used to cast films which, after heat-conversion to the imide state, can be then used as slot liners for motors, as heat-resistant films for packaging, etc. Additionally, the polymeric compositions herein described have great affinity for various metallic surfaces, and thus can be used as structural adhesives; they also can be formed into fibers or other molded products. In conjunction with other natural and synthetic resins such as phenol-aldehyde resins, polyesters, other polyamides, polyimides, etc., they find many uses for upgrading these latter resins, particularly as to their corona resistance. The polyamide resins can be employed as overcoatings and undercoatings to other resins such as polyvinyl formal resins, polyesters, and the like. Because of the outstanding properties which these materials have and particularly their ease of application, stability, storage capabilities, heat and corona resistance, and excellent adhesion, many other applications will be apparent.

Generally these polysiloxane amide resins can be prepared by forming a mixture of ingredients comprising a phthaloyl compound (or mixtures of such phthaloyl compounds) of Formula VI, a diamino compound of Formula V, and a polysiloxane compound of Formula IV. The incorporation of aliphatic diacyl halides e.g., adipoyl chloride, azelaoyl chloride, succinoyl chloride, etc., with the phthaloyl compound in amounts advantageously up to 50 to 75 mol percent of the total molar concentration of the acyl compounds (including the polysiloxane of Formula IV), is not precluded.

In general, the polysiloxane amide is prepared by mixing and stirring at least one organic diamino compound of Formula V with a reactable polysiloxane of Formula IV and a phthaloyl compound of Formula VI, advantageously in an organic liquid which is a solvent for at least one reactant, said solvent being inert to the reactants. Preferably the reaction is conducted under anhydrous conditions for a time of the order of at least one minute at temperatures below 175° C. sufficient to provide a solution containing at least 10% solids of the corresponding polysiloxane amide. In determining a specific time and a specific temperature for forming the aforesaid polysiloxane amide, several factors should be considered. The maximum permissible temperature will depend upon the particular diamine used in combination therewith, the particular polysiloxane compound, and the particular phthaloyl compound, the particular solvent, the percent solids of polysiloxane amide resin which is desired in the final solution, and the minimum period of time one desires for reaction. Generally, temperatures below 100° C. are adequate for the purpose. Since usually the temperature of reaction tends to be exothermic, it may only be necessary to mix the ingredients and therefore permit the temperature to rise to the exotherm temperature, and by further adjusting the temperature with or without the intentional addition of heat, reaction can be completed in a matter of from about 5 minutes to 30 minutes or more up to the time required to give complete reaction to the desired polysiloxane amide. After forming the polysiloxane amide solution, any unreacted materials can be removed and the solution used as such for coating purposes, film formation, etc. Alternatively, the polysiloxane amide may also be treated to remove solvent and used as a shapeable (i.e., moldable) material.

In general, the process for making the polyamide-acid involves reacting approximately a molar amount of the organic diamine of Formula V which equals the total molar concentration of the polysiloxane of Formula IV and the phthaloyl compound of Formula VI in an organic solvent with agitation. Dissolving the reactants in separate solvents and thereafter mixing the solutions may also be employed. Since the reaction tends to be exothermic and to accelerate quite rapidly, it is important in many instances to regulate the additions and the temperature to maintain the reaction temperature below a predetermined value. In all instances, agitation of the reactants is advantageously employed while at the same time maintaining anhydrous conditions. The molar concentration can be varied within certain limits; generally one can employ about 1 mol of the diamino compound per mol of the total molar concentration of the phthaloyl compound and polysiloxane compound of Formula IV combined, in order to obtain a high molecular weight product. However, the use of an excess of up to 5 mol percent of the reactants combined on the above bases is not precluded. Greater molar excesses may result in reduction in the molecular weight.

The molar relationship of the phthaloyl compound and the polysiloxane can be varied widely. Greater heat resistance and stability result if the phthaloyl compound predominates. However, one can employ, on a molar basis, from 0.1 to 10 mols or more of the phthaloyl compound per mol of the polysiloxane of Formula IV.

The polysiloxane amide thus formed can be characterized by its degree of molecular weight and solubility by means of its intrinsic viscosity when measured at 30° C., at a concentration of 0.5 percent, by weight, of the polymer in a solvent such as N-methyl-2-pyrrolidone. The intrinsic viscosity of the polysiloxane amide should be at least 0.1, and preferably in the neighborhood of about 0.2 to 4 or 5.

The quantity of organic solvent used in the present invention need be only that sufficient to dissolve enough of the reactants to form a medium for initiation of the reaction between the organic diamine, the phthaloyl compound, and the polysiloxane. Generally, the solvent comprises from 10 to 90% of the total weight of all the ingredients.

In the organic diamine of the formula $$H_2N—Q—NH_2$$

Q may be any of the following divalent organic groups: aromatic, aliphatic, cycloaliphatic, a combination of aromatic and aliphatic, heterocyclic, bridged organic radicals wherein the bridge is hydrocarbon (e.g., methylene, isopropylidene, etc.) oxygen, nitrogen, sulfur, silicon, phosphorus, or substituted groups thereof. More generally, the diamines used with the cyclic sulfone diamines are primary diamines. Among the diamines which are suitable for use in the present invention are metaphenylene diamine;
para-phenylene diamine,
4,4-diamino-diphenyl propane;
4,4'-diamino diphenyl methane;
benzidine,
4,4-diamino-diphenyl sulfide;
3,3'-diamino-diphenyl sulfone;
4,4'-diamino-diphenyl sulfone;
benzidine cyclic sulfone;
4,4'-methylene-3,3'-sulfonyl dianiline;
4,4'-diamino-diphenyl ether;
2,6-diamino pyridine;
bis-(4-amino-phenyl) diethyl silane;
bis-(4-aminophenyl) phosphine oxide;
bis-(4-aminophenyl-N-methylamine 1,5-diamino-naphthalene;
3,3'-dimethyl-4,4'-diamino-biphenyl;
3,3'-dimethoxy benzidine;
2,4-bis-(beta-amino-t-butyl-phenyl) ether;
para-bis-(2-methyl-4-amino-pentyl) benzene;
para-bis-(1,1-dimethyl-5-amino-pentyl) benzene;
m-xylylene diamine;
p-xylylene diamine;
bis(para-amino-cyclohexyl) methane;
hexamethylene diamine;
heptamethylene diamine;
octamethylene diamine;
nonamethylene diamine;
decamethylene diamine;
3-methylheptamethylene diamine;
4,4'-dimethylheptamethylene diamine;
2,11-diamino-dodecane;
1,2-bis-(3-amino propoxy) ethane;
2,2-dimethyl propylene diamine;
3-methoxy-hexamethylene diamine;
2,5-dimethyl-hexamethylene diamine;
2,5-dimethylheptamethylene diamine;
5-methylnonamethylene diamine;
1,4-diamino-cyclohexane;
1,12-diamino-octadecane;
$H_2N(CH_2)_3—O—(CH_2)_2O(CH_2)_3NH_2$;
$H_2N(CH_2)_3S(CH_2)_3NH$;
$H_2N(CH_2)_3N(CH_3)(CH_2)_3NH_2$; and
mixtures thereof.

Among the phthaloyl compounds of Formula VI which may be employed in the practice of the present invention are, for instance, trimellitic anhydride, 4-chloroformyl phthalic anhydride, 4-bromoformyl phthalic anhydride, etc.

Any solvent may be employed in making the polyamide acids. The solvent should be inert to the system and should be a solvent for the reaction product, and certainly must be a solvent for at least one of the reactants and preferably for all of the reactants. Additionally, the solvent should be one which can be readily removed by volatilization and by application of reasonable amounts of heat. Among such solvents which may be employed are, for example N,N-diethylformamide, N,N-diethylacetamide, N,N-dimethylmethoxy acetamide, N,N-methyl caprolactam, etc. Other solvents which may be used in the present invention are: N-methyl-2-pyrrolidone, tetramethylene urea, pyridine, hexamethylphosphoramide, formamide, N-methyl-formamide and N-acetyl-2-pyrrolidone. The solvents can be used alone, in combinations of solvents, or in combination with poor solvents such as benzene, benzonitrile, dioxane, butyrolactone, xylene, toluene and cyclohexane.

Among the monovalent organic radicals, for example, hydrocarbon radicals, which R' may be are, for instance, alkyl radicals (e.g., methyl, ethyl, propyl, butyl, isobutyl, decyl, etc.); aryl radicals (e.g., phenyl, naphthyl, biphenyl, etc.); alkaryl radicals (e.g., tolyl, xylyl, ethylphenyl, etc.); aralkyl radicals (e.g., benzyl, phenylethyl, etc.); alkenyl radicals (e.g., vinyl, allyl, methallyl, etc.), cyanoalkyl radicals (e.g., cyanomethyl, cyanoethyl, cyanopropyl, etc.); halogenated hydrocarbon radicals (e.g., dichlorophenyl, bromophenyl, etc.). Among the divalent hydrocarbon divalent organic radicals which R may represent are, for instance, ethylene, trimethylene, isopropylidene

[—(CH₃)C(CH₃)—]

isobutylene, tetramethylene, pentamethylene, phenylene, tolylene, xylylene, biphenylene

diphenylene methane (—C₆H₄—CH₂—C₆H₄—)

diphenylene oxide

diphenylene sulfone, etc., with valences of the arylene radicals being ortho, meta, or para to each other or to connecting bonds between adjacent arylene radicals, R is preferably a divalent aliphatic hydrocarbon radical of from 2 to 6 carbon atoms.

Among the polysiloxanes corresponding to Formula IV which may be employed in the practice of the present invention may be mentioned 1,3-bis(γ-carboxypropyl)-1,13,3-tetramethyldisiloxane; 1,3-bis(γ-chloroformylpropyl)1,1,3,-tetramethyldisiloxane; polysiloxanes having the following formulas

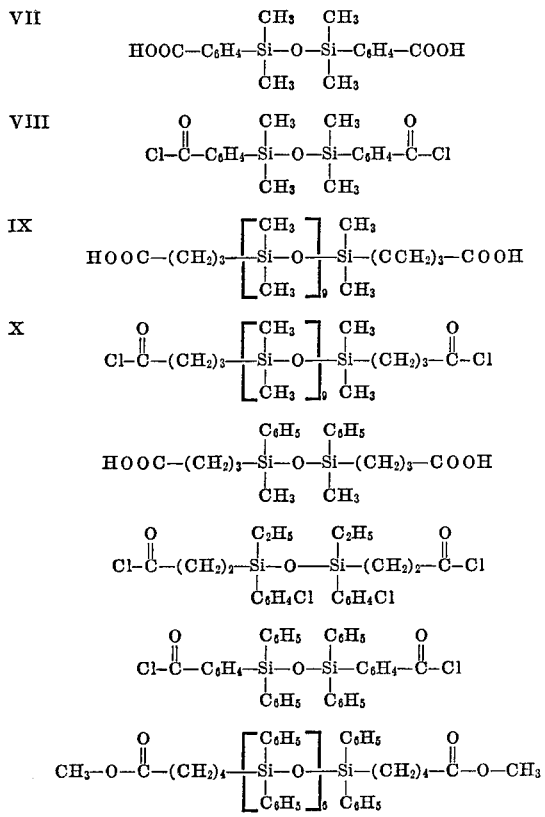

etc.

More broadly these polysiloxanes have the generic formula

XI

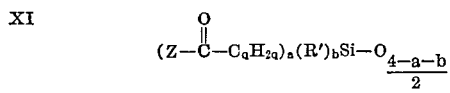

where $a=0.001$ to $0.1$, $q$ is at least 2 or more, e.g., 2 or 3, $a+b=1.999$ to $2.001$, and Z and R′ have the meanings above.

The compositions embraced by Formula IV can be prepared by methods well known in the art. For instance, the carboxy derivatives can be prepared by the hydrolysis of the cyanoalkyl polysiloxanes as shown in U.S. Pat. 2,900,363, issued Aug. 18, 1959. The acyl halides encompassed by Formula IV can be obtained from the carboxy derivative by treatment with a thionyl halide; other means for preparing such polysiloxanes whether carboxy derivatives or the acyl halide derivatives thereof, and further examples of such compositions may be found disclosed in U.S. Pats. 2,589,446, issued Mar. 18, 1952; U.S. 3,047,528 and 3,047,499, both issued July 31, 1962; U.S. 3,143,524, issued Aug. 4, 1964; U.S. 2,601,237, issued June 24, 1952; French Pat. 1,158,808, etc. By reference these patents are all made part of the disclosures and teachings of the instant application as basis for the various polysiloxanes of Formula IV which can be employed as well as a basis for the means for preparing such polysiloxanes.

In order that those skilled in the art may better understand how the present invention may be practiced, the following examples are given by way of illustration and not by way of limitation. In the following examples all reactions were conducted in an inert atmosphere, namely under nitrogen, and under anhydrous conditions.

To establish certain properties, the cut-through temperatures of certain samples were determined. This cut-through temperature is the temperature at which the enamel wire separating two magnet wires crossed at 90° and supporting a given load on the upper wire flows sufficiently to establish electrical contact between two conductors. Since magnet wires in electrical apparatus may be under compression, it is important that the wires be resistant to softening by high temperatures so as to prevent short circuits within the apparatus. The tests are conducted by placing two eight inch lengths of enameled wire perpendicular to each other under a load of 1000 grams at the intersection of the two wires. A potential of 110 volts A.C. is applied to the end of each wire and a circuit which contains a suitable indicator such as a buzzer or neon lamp is established between the ends of the wires. The temperature of the crossed wires and the load is then increased at the rate of 3 degrees per minute until the enamel softens sufficiently so that the bare conductors come into contact with each other and cause the neon lamp or buzzer to operate. The temperature at which this circuit is established is measured by a thermocouple extending into a thermowell to a point directly under the crossed wires. The cut-through temperature is taken as the temperature in the thermowell at the moment when the current first flows through the crossed wires.

EXAMPLE 1

A reaction vessel was charged with 68.64 grams N-methyl-2-pyrrolidone and 9.90 grams (0.05 mol) p,p′-methylene dianiline. The contents were stirred under nitrogen and to this were added 8.42 grams (0.04 mol) 4-chloroformyl phthalic anhydride and 3.43 grams (0.01 mol) bis-(γ-chloroformyl propyl)-1,1,3,3-tetramethyl disiloxane. The temperature of the reaction mixture rose to about 65–70° C. with continued stirring. Stirring was then maintained for a total of about two hours, after which the contents were added to a blending machine containing water and the resultant precipitate was filtered, washed twice with water, dried in a vacuum for about 18 hours at about 105° C. The dry, white powder which was thus obtained was a polysiloxane amide acid composed of recurring structural units of the formula

XII

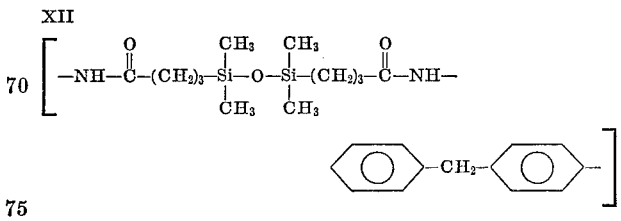

and

XIII 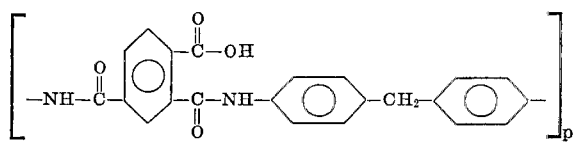

where *n* and *p* are whole numbers in excess of 1. A solution of the above polymer containing 25 percent solids in N-methyl-2-pyrrolidone was prepared and cast as a film on an aluminum substrate, and then heated at 100° C. for one hour, at 150° C., for one hour, at 200° C. for one hour and for ten minutes at 250° C. to give a clear, flexible film which had a cut-through temperature of 310° C. This cured product, which had good electrical characteristics, particularly corona resistance, was a polymer composed of recurring structural units of Formula XII and XIV 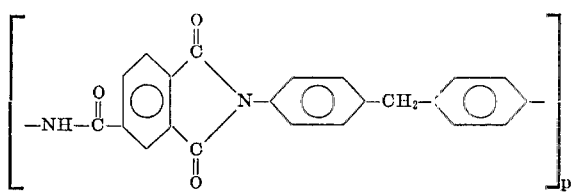

where *p* has the meaning given above.

EXAMPLE 2

A polyamide acid siloxane was prepared similarly as in Example 1 was the exception that 5.40 grams (0.05 mol) m-phenylene diamine was used in place of the 9.90 grams p,p′-methylene dianiline. The reaction of the ingredients and separation of the formed polymer was carried out in the same fashion as in Example 1 to give a polyamide acid composed of recurring structural units of the formula XV 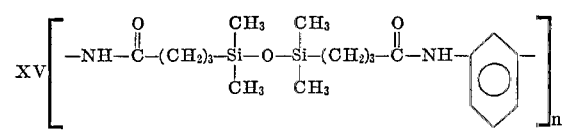

and

XVI 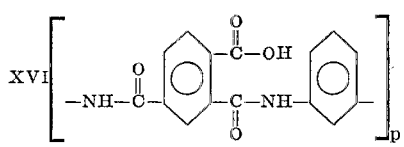

where *n* and *p* are whole numbers in excess of 1. Heating of the polyamide acid under the same conditions as in Example 1 yielded a polysiloxane amide imide having a cut-through of 330° C. and was composed of recurring structural units of Formula XV and XVII 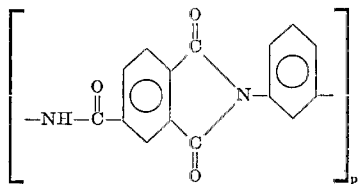

EXAMPLE 3

Employing the same conditions as in Example 1, a polysiloxane amide acid was prepared from 8.42 grams (0.04 mol) 4-chloro formyl phthalic anhydride, 9.00 grams (0.045 mol) p,p′-oxydianiline, 3.43 grams (0.01 mol) bis(γ-chloroformyl propyl) 1,1,3,3-tetramethyl disiloxane, 0.58 grams (0.005 mol) hexamethylene diamine, and 85.7 grams N-methyl-2-pyrrolidone. After effecting reaction and isolation of the polyamide acid in the same fashion as in Example 1, a polymeric composition was obtained which was composed of recurring structural units of the formulas XVIII 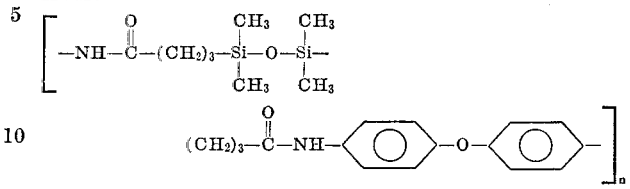

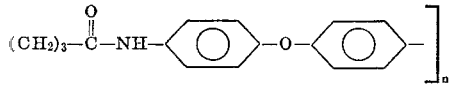

XIX 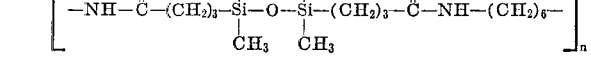

XX 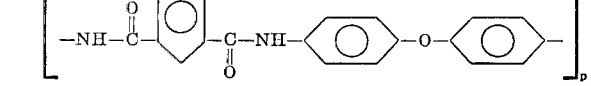

and

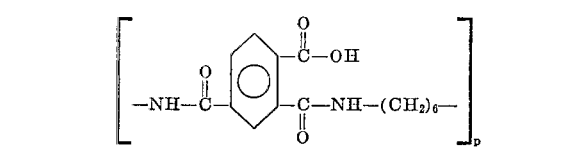

where *n* and *p* are whole numbers greater than 1.

A solution of the polymer in N-methyl-2-pyrrolidone was prepared similarly as was done in Example 1 and a film deposited and heat treated with the same cure cycle as in Example 1 to give a clear, flexible film which had a cut-through of 340° C. The heat-treated product was a polyamide imide composed of recurring structural units of Formula XVIII, Formula XIX, and units of the formula XXII 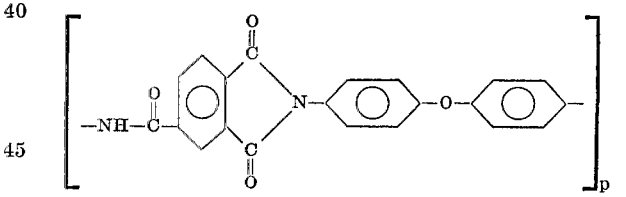

and

XXIII 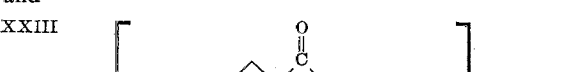

where *p* has the meaning above.

In addition to making polymers of the kind described above, it is also possible to incorporate in the procedural steps for making the polymer a dianhydride of the formula

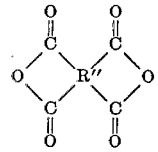

where R″ is an organic tetravalent radical preferably containing at least one ring of six carbon atoms, said ring being characterized by benzenoid unsaturation, the four carbonyl groups being attached directly to separate carbons in a ring, each pair of carbonyl groups being attached to adjacent carbon atoms in a ring of the R″ radical. Among the tetracarboxylic dianhydrides which may be employed in the present invention are the many which are described in U.S. 3,179,614 which by reference is made part of the disclosure of the instant application and include, for instance, pyromellitic dianhydride; 2,3, 6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl) propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl) ether dianhydride, 2,2',4,4'-benzophenone tetracarboxylic acid dianhydride, ethylene glycol bis-trimellitate dianhydride, a dianhydride of the formula

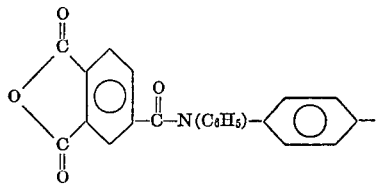

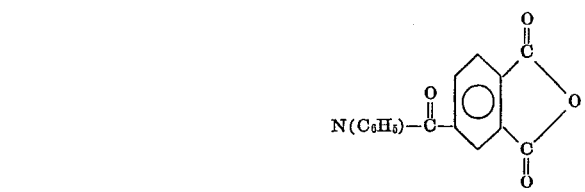

etc.

It will of course be apparent to those skilled in the art that in addition to the diamino compound, phthaloyl compound, and polysiloxane compound employed in the foregoing examples, other members of these classes may be used in the examples which have been recited previously without departing from the scope of the invention. Additional dianhydrides or mixtures of any of the foregoing ingredients can be employed to give new and useful products which in turn can be converted to strong, flexible films, coatings, fibers or other products.

What we claim as new and desire to secure by Letters Patent in the United States is:

1. A polymeric composition of matter selected from the class consisting of (A) polyamide acids composed of recurring structural units of the formulas (a)

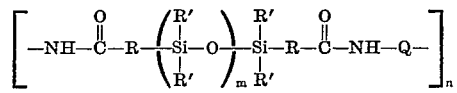

and (b)

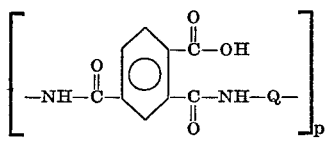

and (B) polyamide imides composed of the recurring structural siloxane units of (a) above and recurring structural units of the formula

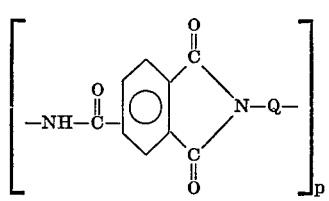

where R is a divalent hydrocarbon radical, R' is a monovalent organic radical selected from the class consisting of monovalent hydrocarbon, monovalent halogenated hydrocarbon, and cyanoalkyl radicals, Q is a divalent organic radical, m is a whole number equal to from 1 to 100, and n and p are whole numbers greater than 1.

2. A polysiloxane amide as in claim 1 composed of recurring structural units of the formulas

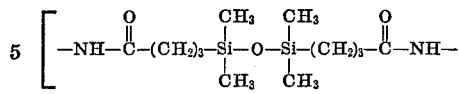

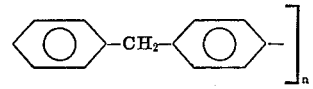

and

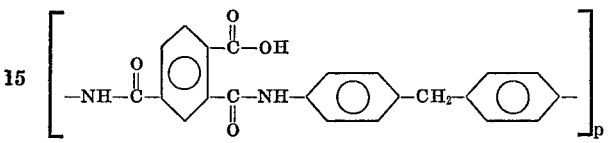

where n and p are whole numbers in excess of 1.

3. A polysiloxane amide as in claim 1 composed of recurring structural units of the formulas

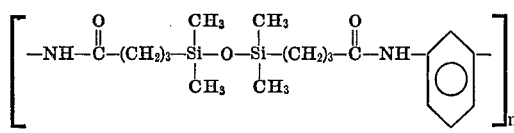

and

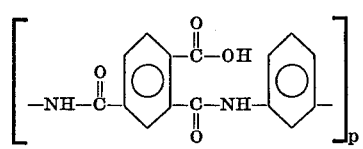

where n and p are whole numbers in excess of 1.

4. A polysiloxane amide as in claim 1 composed of recurring structural units of the formulas

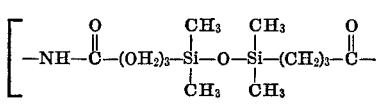

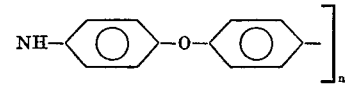

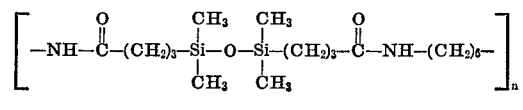

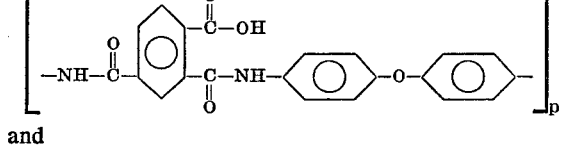

and

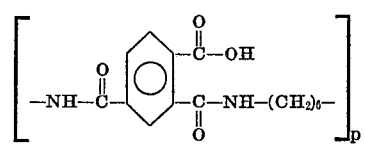

where n and p are whole numbers greater than 1.

5. A polysiloxane amide imide as in claim 1 composed of recurring structural units of the formulas

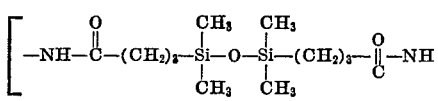

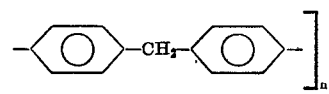

and

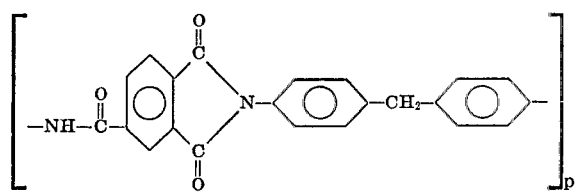

where *n* and *p* are whole numbers in excess of 1.

6. A polysiloxane amide imide and as in claim 1 composed of recurring structural units of the formula

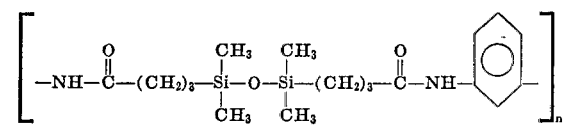

and

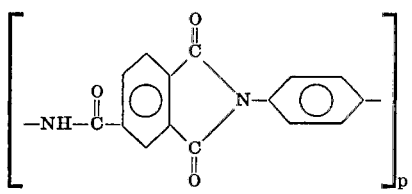

where *n* and *p* are whole numbers greater than 1.

7. A polysiloxane amide imide as in claim 1 composed recurring structural units of the formulas

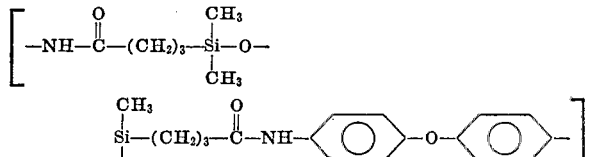

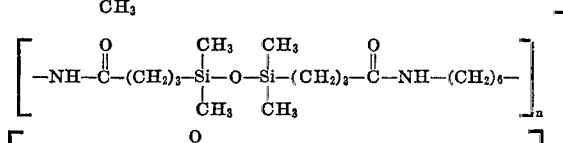

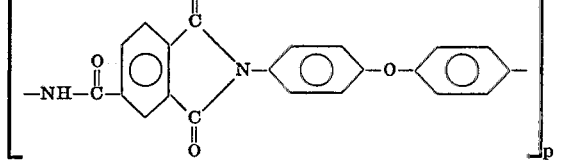

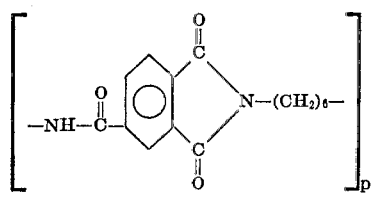

where *n* and *p* are whole numbers in excess of 1.

8. The process for making polysiloxane amides of claim 1 which comprises effecting reaction at a temperature below 175° C. of a mixture of ingredients comprising a polysiloxane of the general formula

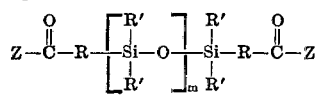

a diamino compound of the general formula

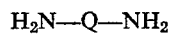

and a phthaloyl compound of the general formula

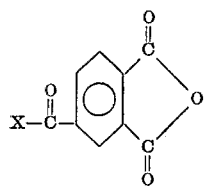

where R is a divalent hydrocarbon radical, R' is a monovalent organic radical selected from the class consisting of monovalent hydrocarbon, monovalent halogenated hydrocarbon, and cyanoalkyl radicals, Q is a divalent organic radical, Z is a member selected from the class consisting of halogen, the hydroxyl radical, and the —OCH₃ radical, X is a member selected from the class consisting of halogen and the hydroxyl radical, *m* is a whole number equal to from 1 to 100, and *n* and *p* are whole numbers greater than 1.

9. The process as in claim 8 wherein the diamino compound is p,p'-methylene dianiline.

10. The process as in claim 8 wherein the polysiloxane is bis(γ-chloroformyl propyl)-1,1,3,3-tetramethyl disiloxane.

11. The process as in claim 8 wherein the phthaloyl compound is 4-chloroformyl phthalic anhydride.

12. The process as in claim 8 wherein the polysiloxane amide from the reaction of the ingredients in claim 8 is subsequently heated at elevated temperatures sufficiently high to convert the polysiloxane amide to a polysiloxane amide imide composed of the recurring structural units of formula

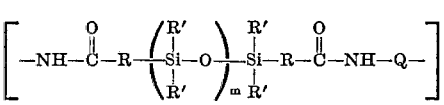

and

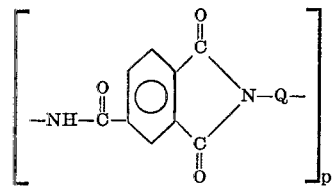

where R, R', Q, *m*, *n*, and *p* have the meanings given in claim 8.

References Cited
UNITED STATES PATENTS 3,392,144  7/1968  Holub _____ 260—46.5
3,435,002  3/1969  Holub _____ 260—46.5

DONALD E. CZAJA, Primary Examiner

M. I. MARQUIS, Assistant Examiner

U.S. Cl. X.R.

117—135.1R, 138.8F, 138.8G; 252—63.7R; 260—32.4R, 32.6R, 32.8SB, 33.6SB, 46.5G, 78TF, 824R, 826R